No. 791,430. PATENTED MAY 30, 1905.
J. F. McCARTY.
GAS BURNER.
APPLICATION FILED FEB. 25, 1905.
2 SHEETS—SHEET 1.
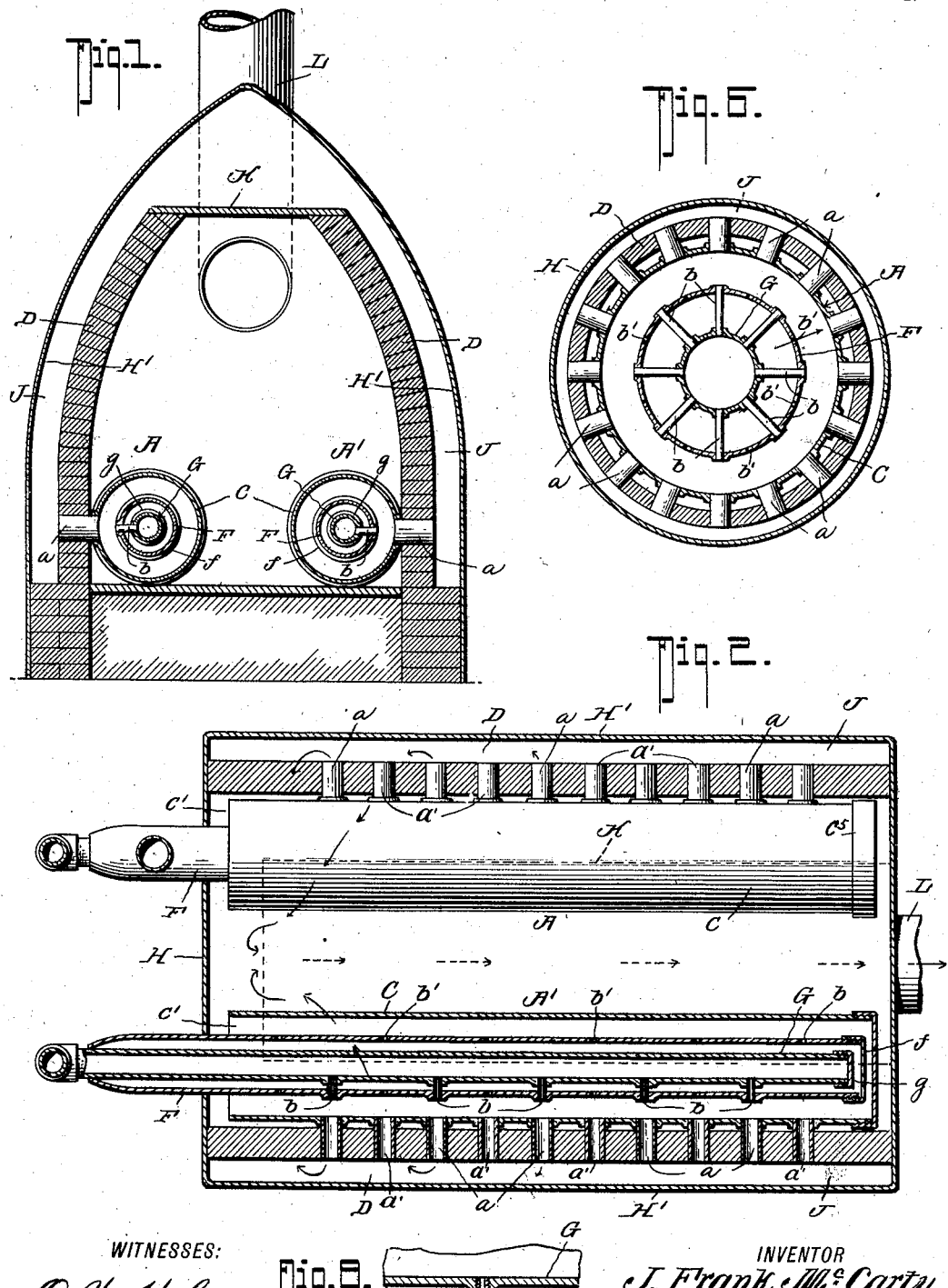
WITNESSES:
O. W. Holmes
John T. Schrott
INVENTOR
J. Frank McCarty,
BY
Fred G. Dieterich
ATTORNEYS

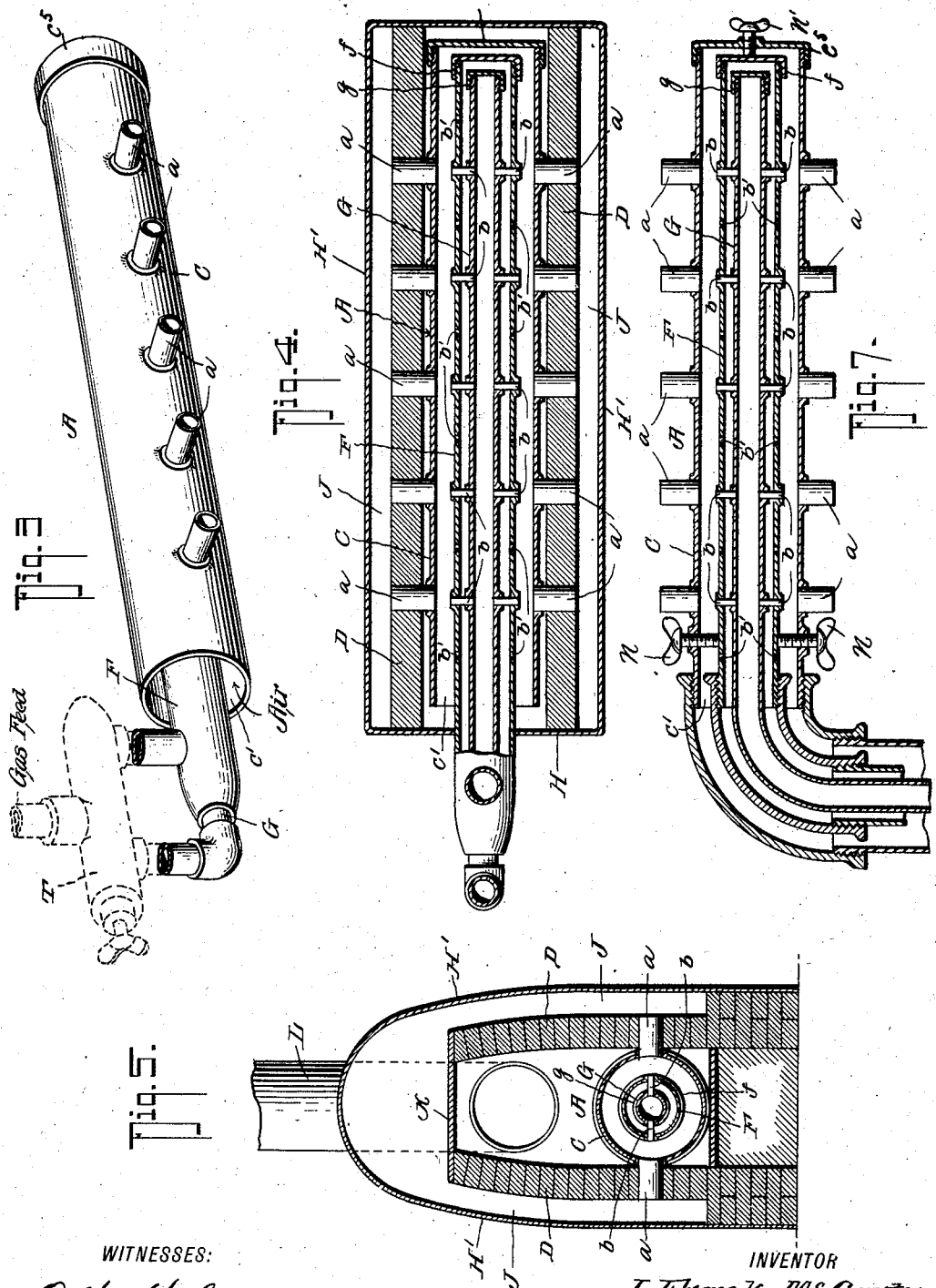

No. 791,430. Patented May 30, 1905.

UNITED STATES PATENT OFFICE.

JOHN FRANK McCARTY, OF MARTINS FERRY, OHIO, ASSIGNOR OF ONE-HALF TO CHARLES D. McCARTY, OF WHEELING, WEST VIRGINIA.

GAS-BURNER.

SPECIFICATION forming part of Letters Patent No. 791,430, dated May 30, 1905.

Application filed February 25, 1905. Serial No. 247,325.

*To all whom it may concern:*

Be it known that I, JOHN FRANK MCCARTY, residing at Martins Ferry, in the county of Belmont and State of Ohio, have invented a new and Improved Gaseous-Fuel Burner and Heater, of which the following is a specification.

My invention seeks to provide a new and improved construction of gas burner and heater; and it primarily has for its object to provide a simple and inexpensive construction of burner having a special arrangement of parts whereby a portion thereof can be cut out while the remainder is left burning in such a manner that a large amount of gas is saved without reducing the pressure of the gas in that portion of the burner which remains turned on or left burning.

In its generic nature my invention comprehends a burner composed of an inner and an outer independent gas-conveyer, both of which connect with a single air-chamber, all of the gas-conveyers having nipples or ejectors, one-half of those in the inner gas-conveyer being arranged to discharge directly into one-half or all of the nipples or ejectors that connect with the outer gas-conveyer.

In its more complete nature my invention embodies a coöperative interdependent arrangement of a burner designed on the lines above referred to with a casing or heat-collecting housing so arranged whereby the maximum direct and radiated heat effect of the burner is fully and economically utilized.

In its more subordinate features my invention consists in certain details of construction and peculiar combination of parts, all of which will be hereinafter fully explained, and pointed out in the appended claims and illustrated in the accompanying drawings, in which—

Figure 1 is a cross-section of a heater constructed in accordance with my invention. Fig. 2 is a horizontal section thereof taken on the line 2 2 of Fig. 1, the burner at one side being shown in plan view. Fig. 3 is a perspective view of the burner shown in Fig. 2. Fig. 4 is a horizontal section of a modification of the structure shown in Figs. 1 and 2. Fig. 5 is a vertical section thereof. Fig. 6 is a horizontal section of a round or upright burner. Fig. 7 is a plan view, partly in section, of a further modification of the burner hereinafter described. Fig. 8 is a detail view hereinafter referred to.

In the practical application of my invention when it is arranged as a horizontal heating appliance, which is the preferred construction, two burners are provided which are arranged in parallel, as clearly shown in Figs. 1 and 2.

Each of the burners A A' consists of an inner gas-pipe G, located within an outer gas-pipe F and both mounted within a tubular casing C, which may be a gas-pipe of greater diameter than the pipe F and which at one end $c'$ is open for the ingress of air and in the preferred construction has its outer end closed by a screw-cap $c^5$, similar caps $g$ and $f$ being employed for closing the corresponding ends of the inner and outer gas-pipes G and F. (See Fig. 2.) When utilized in the manner shown in Figs. 1 and 2, the front ends of the pipes F and G extend through the front wall of the sheet-metal casing or housing H, and the said ends connect with the reducing-valve T in the supply-pipe, as shown.

It will be noticed in Figs. 1 and 2 that the two burners A A' lie adjacent the inner side walls D, preferably built up of brick and which are disposed close up to the outer metal side walls H' of the casing, and the said burners each have a series of nipples $a$, that are screwed into the tubular air-casing C, and which project through the inner or brick wall D and discharge into the heating-space J between the inner and outer walls of the housing, and at their inner ends the said nipples $a$ have a screw connection with the air-casing C, as clearly shown in Fig. 1.

$b$ designates a series of nipples of less diameter than that of the nipples $a$, which are screwed into and connect the two gas-pipes G and F, as best shown in Fig. 2, by reference to which it will be noticed that additional burner-openings $b'$ are formed in the outer pipe F at points intermediate the openings through which the nipples $b$ eject, and which aline with the nipples $a'$ $a'$, located in the wall D, similar to the nipples $a$, as clearly shown in Figs. 2 and 6.

The inner walls D serve to bring the fire from the burner-nipples $a$ directly in contact with the surface to be heated and at the same time cut down the fire-box space in practice to four inches, more or less, at each side.

The several side walls D do not extend up the full height of the outer walls of the casing, the upper part of which is preferably dome-shaped, and upon the tops of the said side walls D is placed a baffle or flame cover-plate K, which baffles the flame or products of combustion toward the front end of the housing where the said products pass under the plate K and thence back and out through the offtake-flue L, as shown.

The bottom of the housing or heating-casing is made perfectly tight, so that no air is admitted into the burners, only through the inlet end of the casing C. This is important, since it provides for a perfect admixture of the air with the gas and as it escapes through the nipples $a$ and $b$.

By arranging the crown or cover plate K in the manner shown and described all of the heat generated within the heater is caused to pass from the rear to the front and return underneath the plate K and the smoke or offtake pipe L.

In Fig. 4 I have shown a slightly-modified arrangement of my invention, and in this form but a single burner A is used, with the nipples $a$ $b$ $b'$ provided in diametrically opposite directions and with the two side brick walls disposed close up against the heater.

In Fig. 6 my heater is shown as a round or upright heater, and in this figure the general arrangement is similar to that shown in Figs. 1 and 2, except that the inner wall D is a continuous circular wall and the nipples $a'$ and $b'$ radiate from the air-casing that surrounds the inner and outer gas-pipes.

In Fig. 7 is shown a still further modification of my invention, and in this form the inner and outer gas-pipes are supported within the air-casing C by set-screws N N, that pass through the sides of the said casing, and a set-screw N', that passes through the cap end thereof.

From the foregoing description, taken in connection with the accompanying drawings, it is believed the complete construction, the general operation, and the advantages of my invention will be readily understood.

It will be noticed that by reason of the peculiar correlation of the pipes F and G and the nipples $a$ $b$ and $a'$ $b'$, that when gas is on in both pipes F and G, all of the nipples that discharge into space J will fire, but when the pipe F is cut off only the nipples $b$ will fire into nipples $a$, and when pipe G is cut out the nipples $a'$ $a'$ will be fired by the escape of the gas from the openings $b'$ in the outer pipe F when gas is on in said pipe.

In the practical application of a burner constructed as shown no turning down of the burners is required at any time, and hence the proper mixture of the air with the gas is at all times maintained and in a manner not possible where the burners are turned down and the gas-pressure therein is decreased.

By arranging the burners at the side of the inner wall located near the surface to be heated and projecting the several nipples through the said inner wall and the pipe-space between the two walls I am enabled to reduce the heating-space from three and a half feet wide, which is usually required, to four inches on either side, which I find in practice effects a great saving in the amount of gas needed to effect the desired heating results.

Having thus described my invention, what I claim, and desire to secure by Letters Patent, is—

1. A heating means of the character described, which comprises a housing having a combustion-offtake, a supplemental or inner wall at each side spaced from the outer wall, a gaseous-fuel burner located between the said inner walls and having ejector-nozzles projected through the said walls that discharge into the space between the inner and outer walls of the housing, and a means that forms a coöperative part of the burner, controlled from the outside of the housing, for cutting off the supply of gas to a portion of the ejector without decreasing the gas-pressure in the remaining ejectors.

2. In a gas-heating means as described, the combination with the housing, said housing including supplemental inside walls spaced apart from the outer side walls, but not extending the full height thereof, a baffle-plate mounted on top of the said inside walls for deflecting the products of combustion to the front part of the housing, an offtake in the rear end of the housing in a plane below the baffle-plate, a gaseous-fuel burner at each inner side wall, said burners having flame-ejectors that project through the inner side walls into the space between said side walls, and the outer sides of the housing, and a means controlled from the outside of the housing for cutting out a part of the burner-discharges without reducing the gas-pressure in the remainder of said discharges, as set forth.

3. In a gas-heating means of the character described, a burner which comprises an inner and an outer gas-chamber, and an air-chamber in which the two gas-chambers are located, an independent gas-feed to each gas-chamber, each of the gas-chambers having discharge-orifices that open into the air-chamber, the latter having ejector-nipples, and a means for cutting out the gas-supply to either of the gas-chambers without reducing the gas-pressure to that chamber not cut out.

4. A gaseous-fuel burner of the character described, which consists of a pipe having one end closed and the other connected to a gas-supply, a second pipe that surrounds the first pipe, having one end closed and the other connected with a gas-supply, said second pipe having a number of laterally-discharging outlets, the inner pipe having a number of laterally-discharging nipples that extend through the outer gas-pipe a third pipe that surrounds the two gas-pipes, closed at one end and open at the other, said third pipe having a number of ejector-nipples, and a means connected with the gas-supply for the two gas-pipes arranged to cut out either of said gas-pipes without reducing the pressure in the one not cut out, as set forth.

5. A gas-burner of the character described, which consists of an inner pipe closed at one end and connected with a fuel-supply, a second pipe that surrounds the first pipe, also closed at one end and having a fuel-supply independent of the supply for the inner pipe and a third pipe which surrounds the other two pipes, the said third pipe being closed at one end, having an air-feed at the other end and provided with burner ejector-nozzles, the outer one of the gas-pipes having discharges that open into the outer or air pipe, the inner gas-pipe having discharges which extend through the outer gas-pipe and open into the air-pipe, and a means for cutting off the gas-supply of either one of the two gas-pipes without cutting off the gas-supply to that gas-pipe not cut out, as set forth.

J. FRANK McCARTY.

Witnesses:
R. A. LINDENSUTT,
W. B. FRANCIS.